United States Patent
Irwan et al.

(10) Patent No.: US 10,630,702 B1
(45) Date of Patent: Apr. 21, 2020

(54) PROTOCOL AGNOSTIC SECURITY BY USING OUT-OF-BAND HEALTH CHECKS

(71) Applicant: Xage Security, Inc., Palo Alto, CA (US)

(72) Inventors: Susanto Junaidi Irwan, San Francisco, CA (US); Roman M. Arutyunov, San Jose, CA (US); Andy Sugiarto, Moraga, CA (US); Ganesh B. Jampani, Gilroy, CA (US)

(73) Assignee: Xage Security, Inc., Palo Alto, CA (US)

( * ) Notice: Subject to any disclaimer, the term of this patent is extended or adjusted under 35 U.S.C. 154(b) by 0 days.

(21) Appl. No.: 16/270,245

(22) Filed: Feb. 7, 2019

(51) Int. Cl.
*G06F 12/14* (2006.01)
*H04L 29/06* (2006.01)
*H04L 9/32* (2006.01)
*H04L 12/66* (2006.01)
*H04L 29/08* (2006.01)

(52) U.S. Cl.
CPC ........ *H04L 63/1416* (2013.01); *H04L 9/3236* (2013.01); *H04L 12/66* (2013.01); *H04L 63/0428* (2013.01); *H04L 63/0876* (2013.01); *H04L 63/1433* (2013.01); *H04L 63/1441* (2013.01); *H04L 63/18* (2013.01); *H04L 63/20* (2013.01); *H04L 67/2809* (2013.01)

(58) Field of Classification Search
None
See application file for complete search history.

(56) References Cited

U.S. PATENT DOCUMENTS

| 10,169,587 | B1 * | 1/2019 | Nix ........................ G06F 21/57 |
| 2018/0359244 | A1 * | 12/2018 | Cockerill ............ H04L 63/0853 |
| 2019/0046056 | A1 * | 2/2019 | Khachaturian ........ G16H 40/63 |

* cited by examiner

*Primary Examiner* — Brandon S Hoffman
(74) *Attorney, Agent, or Firm* — Hickman Palermo Becker Bingham LLP (57) ABSTRACT

A computer-implemented method provides an improvement in security breach detection and comprises using a broker computing device, sending an initial digital fingerprint of a computing device out-of-band for storing in a distributed data repository, wherein the initial digital fingerprint is based on initial security service data of the computing device; using a gateway computing device, remotely calculating a current digital fingerprint of the computing device based on current security service data of the computing device; using the gateway computing device, conducting a real-time out-of-band health check of the computing device based, at least in part, on the initial digital fingerprint stored in the distributed data repository; and using the gateway computing device, in response to conducting the real-time out-of-band health check, determining whether to restore the computing device with configurations consistent with the initial digital fingerprint stored in the distributed data repository.

18 Claims, 7 Drawing Sheets

PROTOCOL AGNOSTIC SECURITY BY USING OUT-OF-BAND HEALTH CHECKS

TECHNICAL FIELD

One technical field of the present disclosure relates to methods, systems, computer software, and/or computer hardware in the field of data security. Another technical field is computer-implemented methods and systems for providing continuous, out-of-band security checks that function in real time using a distributed architecture and distributed database. Another technical field is providing device integrity health check services for industrial devices or Internet of Things (IoT) devices and resistance of networked industrial devices and IoT devices to attacks, unauthorized or malicious use, or malware.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The development and deployment of internet of things (IoT) devices has proceeded with remarkable speed in the past several years. IoT devices are diverse, including everything from controllers of industrial equipment to smart watches and personal activity monitors. However, security infrastructure has not kept pace with the huge number and wide use of these devices. Some analysts estimate that billions of such devices will be operating and connected to internetworks within a few years, but there is presently no effective security architecture that can efficiently permit IoT devices to be secured, yet readily usable. Key constraints in this technical field have included limited processing power, limited memory, limited or absent user interface elements, and limited and intermittent network connectivity. All these characteristics of IoT devices make them difficult to integrate into existing security systems. At the same time, misuse of IoT devices could be catastrophic by permitting an attacker or unauthorized user to gain control of industrial equipment or other systems that have embedded IoT devices.

Industrial and commercial operators are currently deploying millions of IoT devices in various enterprise environments. These IoT devices often use different data communication protocols to communicate. In previous approaches, security measures have been data protocol-dependent, making these security techniques difficult to universally apply to devices that communicate using different protocols. Moreover, previous security techniques often required prior knowledge of malware signatures and attack patterns, which limited the effectiveness of such security techniques in preventing previously unknown attacks.

Thus, there is a need for decreasing the network and computing processing burden of implementing various data protocol-dependent security measures by using a data protocol-agnostic device health check system. There is also a need for better security breach detection and protection that is not dependent on known malware signatures and attack patterns. There is also a need for a secure method of storing and accessing device information that is tolerant of security breaches.

SUMMARY

The appended claims may serve as a summary of the invention.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein in sections according to the following outline:

1.0 GENERAL OVERVIEW
 2.0 STRUCTURAL OVERVIEW
 3.0 FUNCTIONAL OVERVIEW
   3.1 SECURITY BROKER
   3.2 SECURITY GATEWAY
   3.3 DISTRIBUTED LEDGER OPERATIONS
 4.0 PROCEDURAL OVERVIEW
 5.0 HARDWARE OVERVIEW 1.0 General Overview According to various embodiments, methods and systems are provided that enable improved computer processing efficiency and data security. A distributed system that uses a security broker to collect hardware, firmware, and software data, generate a fingerprint based on the data, and send the fingerprint out-of-band to a distributed data repository for storage. The distributed system also uses a security gateway to continuously conduct out-of-band validity checks using the fingerprint stored in the distributed data repository. The validity checks are used to restore the device with the data over unauthorized changes to the device or to remove unauthorized changes from the device. When the security gateway is inline between devices or between devices and users, the security gateway may behave as a firewall, thereby either allowing traffic through when fingerprints match or blocking traffic when fingerprints do not match.

The distributed system utilizes a distributed ledger database to store the data, thereby using a consensus network for increased data security. This approach has the benefit of decreasing excessive use of processing resources while increasing resistance against malicious attacks on sensitive data.

In an embodiment, a computer-implemented method provides improvements in security breach detection and mitigation. The method comprises using a broker computing device, sending an initial digital fingerprint of a computing device out-of-band for storing in a distributed data repository, wherein the initial digital fingerprint is based on initial security service data of the computing device. The method further comprises using a gateway computing device, remotely calculating a current digital fingerprint of the computing device based on current security service data of the computing device. The method further comprises using the gateway computing device, conducting a real-time out-of-band health check of the computing device based, at least in part, on the initial digital fingerprint stored in the distributed data repository. The method further comprises using the gateway computing device, in response to conducting the real-time out-of-band health check, determining whether to restore the computing device with configurations consistent with the initial digital fingerprint stored in the distributed data repository.

2.0 Structural Overview

Figure 1:
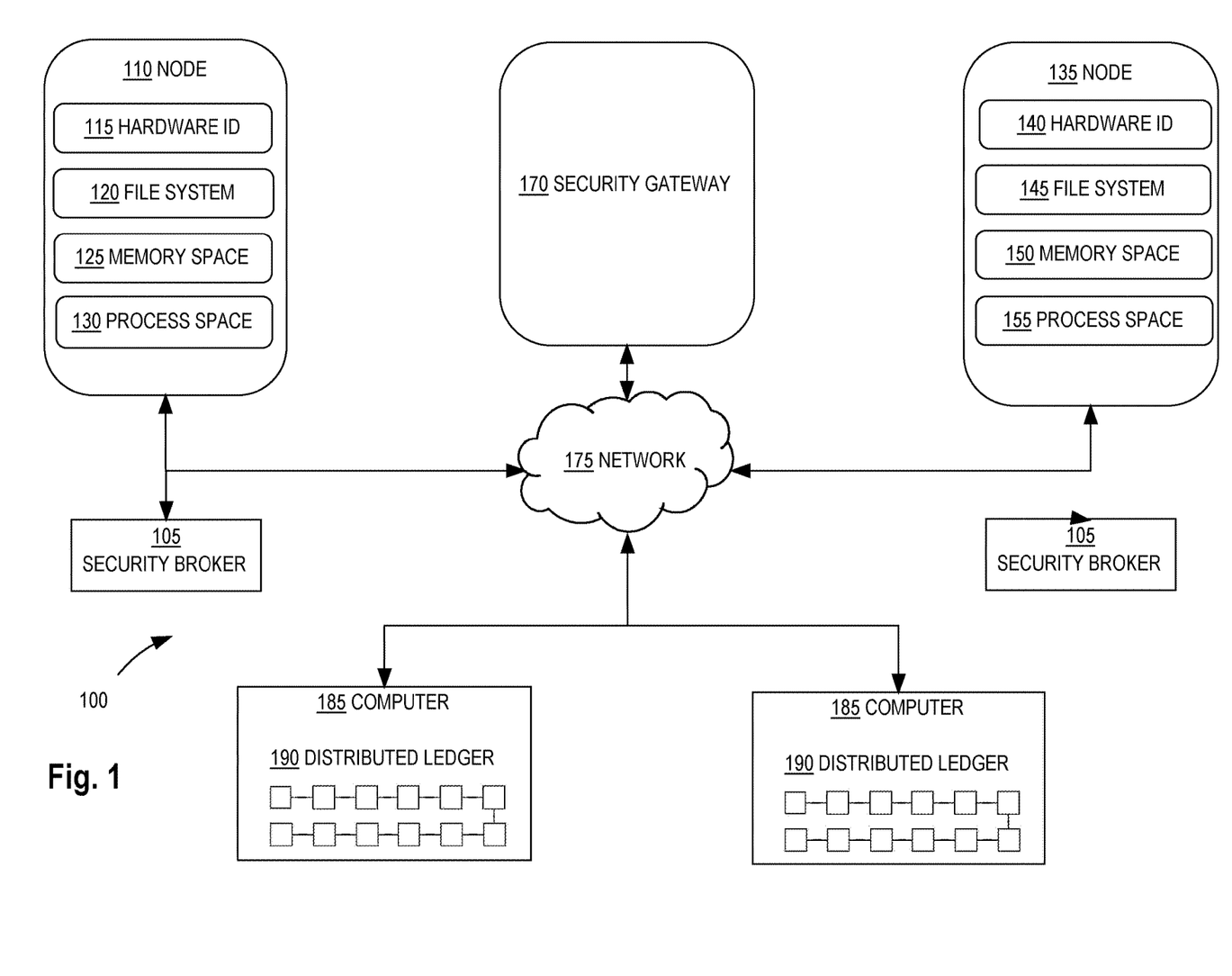
FIG. 1 illustrates a networked computer system, in an example embodiment.

FIG. 1 illustrates a networked computer system in an example embodiment.

In an embodiment, a computer system 100 comprises components that are implemented at least partially by hardware at one or more computing devices, such as one or more hardware processors executing program instructions stored in one or more memories for performing the functions that are described herein. All functions described herein are intended to indicate operations that are performed using programming in a special-purpose computer or general-purpose computer, in various embodiments. A "computer" may be one or more physical computers, virtual computers, and/or computing devices. As an example, a computer may be one or more server computers, cloud-based computers, cloud-based cluster of computers, docker containers, virtual machine instances or virtual machine computing elements such as virtual processors, storage and memory, data centers, storage devices, desktop computers, laptop computers, mobile devices, and/or any other special-purpose computing devices. Any reference to "a computer" herein may mean one or more computers, unless expressly stated otherwise. The instructions identified above are executable instructions and may comprise one or more executable files or programs that have been compiled or otherwise built based upon source code prepared in JAVA, C++, OBJECTIVE-C or any other suitable programming environment.

FIG. 1 illustrates only one of many possible arrangements of components configured to execute the programming described herein. Other arrangements may include fewer or different components, and the division of work between the components may vary depending on the arrangement. In the example of FIG. 1, a networked computer system 100 may facilitate the secure exchange of data between programmed node computing devices 110, 135, security brokers 105, security gateways 170, and devices 185 of a distributed ledger. Therefore, various elements of 105, 110, 135, 170, and 185 of FIG. 1 may each represent one or more computers that host or execute stored programs that provide the functions and operations that are described further herein in connection with data verification and regulation services and distributed ledger operations.

The methods and systems describe herein may be data protocol-agnostic and designed to accommodate a variety of different devices that use different protocols for data communication. The methods and systems described herein may also increase security without relying on prior knowledge of malicious attack patterns or malware signatures. While each of the components listed in FIG. 1 is illustrated as if located on a single device, one or more of the components listed above may be part of and/or executed on different computers. For example, the security broker 105 is depicted as being separate and distinct from the gateway 170, in some embodiments, the security broker 105 may run on the gateway 170.

The node 110, 135 may be computer, software, firmware, hardware, or any combination thereof. In an embodiment, the node 110, 135 may be a computer, a virtual computer, and/or a computing device. As an example, a computer may be one or more server computers, cloud-based computers, cloud-based cluster of computers, docker containers, virtual machine instances or virtual machine computing elements such as virtual processors, storage and memory, data centers, storage devices, desktop computers, laptop computers, mobile devices, and/or any other special-purpose computing devices.

The nodes 110, 135 may also be IoT devices, which are physical devices with network connectivity capabilities that enables these physical devices to collect and exchange data. In an embodiment, the IoT devices may be industrial IoT meters, sensors, controllers, cameras, or any other industrial IoT device. In an embodiment, the node 110, 135 may be one or more of a variety of networked computing devices in an industrial control system, such as a Supervisory Control and Data Acquisition (SCADA) system that uses a series of computers, programmable logic controllers, Proportional Integral Derivative (PID) controllers, remote terminal units, and other networked devices for process control in an industrial environment. The node 110, 135 may also be a software application or any other stored computing instructions running on a computing device.

Each node 110, 135 may have data related to hardware identifier 115, 140, a file system 120, 145, memory space 125, 150, process space 130, 155, or any other features of the node 110, 135. The data is subsequently used to generate unique fingerprints for the implementation of integrity health checks in an improved security system.

A security broker 105 may be a computer, software and/or hardware or a combination storing instructions that are programmed or configured to access security service data related to node 110, 135 and securely transfer the security service data. In an embodiment, the security broker 105 may generate a fingerprint based on the security service data and send the fingerprint over a network 175 to a distributed data repository, such as a digital distributed ledger 190 data repository, for storage, as further described herein.

Network 175 broadly represents a combination of one or more wireless or wired networks, such as local area networks (LANs), wide area networks (WANs), metropolitan area networks (MANs), global interconnected internetworks, such as the public internet, or a combination thereof. Each such network may use or execute stored programs that implement internetworking protocols according to standards such as the Open Systems Interconnect (OSI) multi-layer networking model, including but not limited to Transmission Control Protocol (TCP) or User Datagram Protocol (UDP), Internet Protocol (IP), Hypertext Transfer Protocol (HTTP), and so forth. All computers described herein may be configured to connect to the network 175 and the disclosure presumes that all elements of FIG. 1 are communicatively coupled via the network 175. The various elements depicted in FIG. 1 may also communicate with each other via direct communications links that are not depicted in FIG. 1 for purposes of explanation.

The distributed ledger 190 may comprise blocks of linked data that are stored in an interconnected network of computers, with suitable stored programs at those computers to support ordered creation and transmission of distributed ledger data. The distributed ledger 190 forms a distributed database that maintains a continuously growing list of ordered records termed blocks that are timestamped and linked to a previous block. Each block in the series of blocks is linked together chronologically, with each new block containing a hash of the previous block. Each computer 185, or node, in a network of computers may store the entire record of linked data blocks. This creates a consensus network of computers that can verify the integrity of each block of data and the integrity of the entire distributed ledger 190. The consensus network has the benefit of having a high Byzantine fault tolerance, which is the ability of a computing system to tolerate Byzantine failures. As a result, the distributed ledger 190 functions as a distributed database that contains all records and any changes thereto and ensures the integrity of the data by utilizing hash functions to link each block to its previous block and storing the entire record of data blocks at each node.

The security gateway 170 may be a computer, software and/or hardware or a combination storing instructions configured to continuously conduct out-of-band integrity health checks using the fingerprint stored in the distributed ledger. These checks are used to restore the node 110, 135 with the security service data over unauthorized changes to the device 110, 135 or to remove unauthorized changes from the device 110, 135. Although not illustrated in FIG. 1, the security gateway 170 may be inline between devices or between devices and users. In an embodiment, when the security gateway 170 is inline between devices or between devices and users may behave as a firewall to either allow traffic from the node 110, 135 through when fingerprints match or block traffic from the node 110, 135 when fingerprints do not match.

3.0 Functional Overview

In an embodiment, the security broker 105, the distributed ledger 190, and the security gateway 170 interoperate programmatically in an unconventional manner to provide a virtual security intermediary that continuously validates the integrity of devices out-of-band. In an embodiment, the security gateway 170 is programmed to verify the integrity of various devices using the data stored in the distributed ledger 190. The security broker 105, distributed ledger 190, and the security gateway 170 are programmed or configured to copy, encrypt, distribute, store, transport, and monitor sensitive security information in a secure manner so that the security gateway 170 may perform these checks using the data, as further described in other sections herein.

3.1 Security Broker

Figure 2:
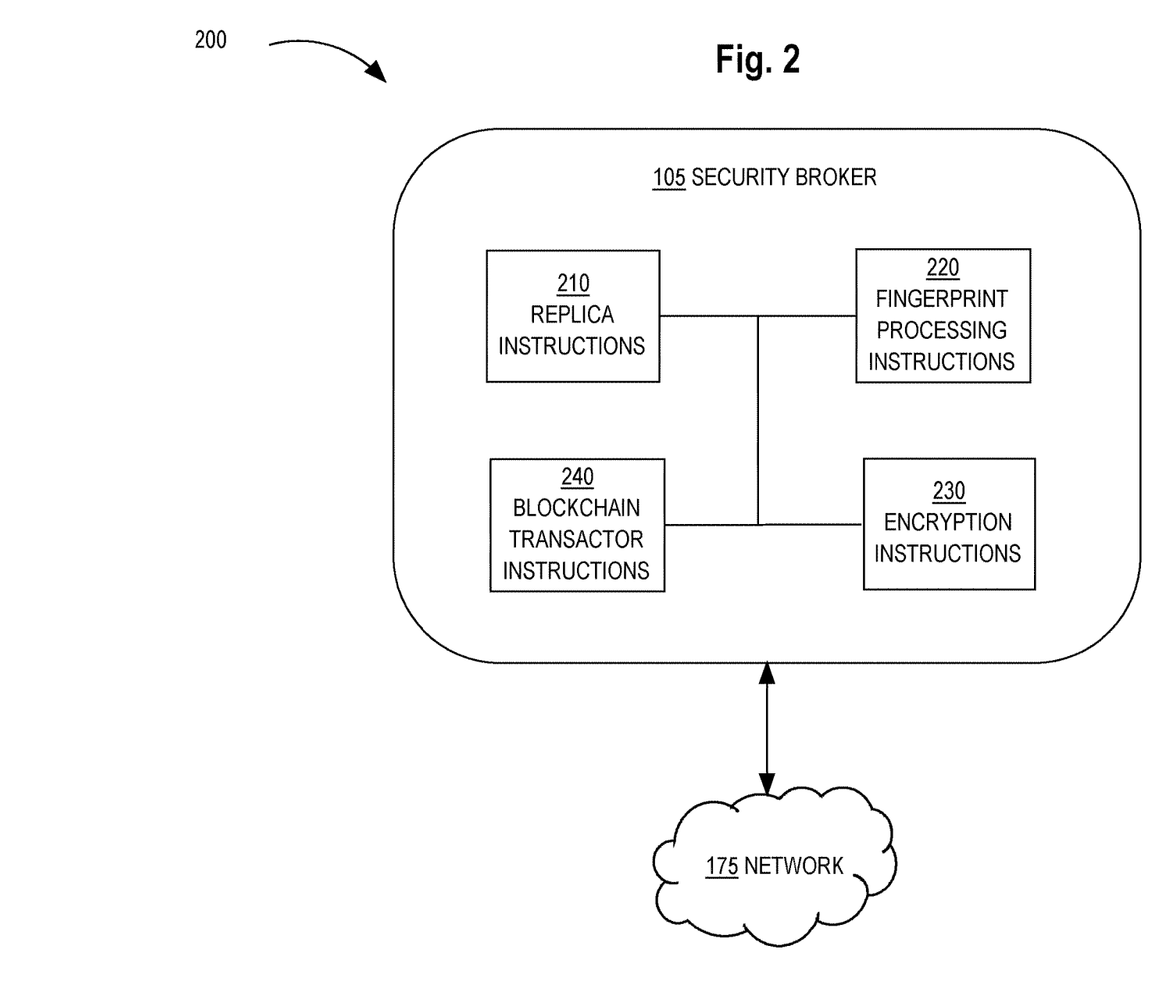
FIG. 2 illustrates a security broker, in an example embodiment.

FIG. 2 illustrates a security broker, in an example embodiment.

In an embodiment, reference numeral 200 indicates a computer system comprising the security broker 105 coupled to the data network 175. Specifically, the security broker 105 may store and execute replica instructions 210 which generate a digital replica of each node system, including data related to hardware identifiers 115, 140, file systems 120, 145, memory space 125, 150, process space 130, 155, or any other features of the node 110, 135. In an embodiment, the digital replica may be stored locally in a data repository associated with the security broker 105.

The security broker 105 may also store and execute fingerprint processing instructions 220, which generates a fingerprint based on security service data from the digital replica of each node system. In this context, a fingerprint is a set of digital data forming a unique digital identifier for the node 110, 135. The fingerprint may comprise multiple object identifiers for security service data, such as hardware data, firmware data, software data (such as, but not limited to, files, processes, configuration data, register values, point values), memory space usage, or any other data from the node 110, 135. In an embodiment, the fingerprint processing instructions 220 may generate object identifiers for hardware-based security service data, such as object identifiers for a Central Processing Unit (CPU) identifier, a Media Access Control (MAC) address, a hard drive serial number, and/or a memory identifier. In another embodiment, the fingerprint processing instructions 220 may generate object identifiers for firmware-based security service data such as a firmware identifier and/or a firmware signature. In another embodiment, the fingerprint processing instructions 220 may generate object identifiers for software-based security service data, such as a static checksum of the files stored in the node 110, 135, a dynamic checksum of one or more processes in memory, and/or a dynamic checksum of configuration data, register values and/or point values through an industrial protocol such as Modbus or DNP3. In another embodiment, the fingerprint processing instructions 220 may generate object identifiers for memory space. Specifically, weighted calculations may be used to evaluate memory space and determine the amount of memory that is reasonably or commonly used by specific programs running on the node 110, 135. Any unreasonable or uncommon memory usage may be designated as an anomaly. Any of the above one or more object identifiers may be used in generating a fingerprint. This information establishes a unique set of records for the node 110, 135 that may serve as its initial identity or profile.

In an embodiment, the security broker 105 may also store and execute instructions for dynamically specifying which object identifiers should be checked by the security gateway 170 during a health check. For example, the security broker 105 may use security policies to specify which of the one or more object identifiers listed above may be used by the security gateway 170 during the health check.

In an embodiment, each object identifier may be encrypted by encryption instructions 230 to generate the fingerprint. For example, the encryption instructions 230 may apply a hash algorithm, such as an MD5, Secure Hash Algorithm (SHA) 256, or any other hash function, to each of the object identifiers to generate a plurality of hashed or encrypted data object identifiers. The hash may act as a numerical representation of the object identifiers. Any hash function, as understood in the art, may be used. Any changes to the object identifiers would change the hash, thereby creating differences in the current hash compared to a previous hash.

In an embodiment, the fingerprint is not a single hash of all the object identifiers, but rather multiple hashes of each object identifier to enable dynamic health checks of each of the encrypted data object identifiers individually. The fingerprint, containing each of the encrypted object identifiers, is then sent over the network 175 to the digital distributed ledger 190 data repository for storage using distributed ledger transactor instructions 240. The distributed ledger transactor instructions 240 update the distributed ledger 190 by creating new data entries of the fingerprint in the distributed ledger 190.

In an embodiment, any authorized changes to the node 110, 135 may first be applied to the digital replica generated by the security broker 105, and an updated fingerprint calculated and sent to the distributed ledger 190 for storage. For example, the replica instructions 210 may enable a verified administrator to access the digital replica and apply changes and/or updates to the hardware, software, firmware, or any other features of a system with nodes 110, 135. The administrator may, for example, update a file in the file system 120, 145. The security broker 105 may then use fingerprint processing instructions 220 to generate new object identifiers for the altered data and subsequently use encryption instructions 230 to recalculate an updated fingerprint based on the changes. In another embodiment, a verified administrator may directly perform authorized changes and/or updates to the hardware, software, firmware, or any other features of the node 110, 135 and enable a nearby security gateway 170 to remotely calculate an updated digital fingerprint based on these changes and report back to the security broker 105. In both embodiments, the security broker 105 may then use distributed ledger transactor instructions 240 to send the updated fingerprint over the network 175 to the distributed ledger 190 for storage. The distributed ledger transactor instructions 240 update the distributed ledger 190 by creating new data entries of the updated fingerprints in the distributed ledger 190.

3.2 Security Gateway

Figure 3:
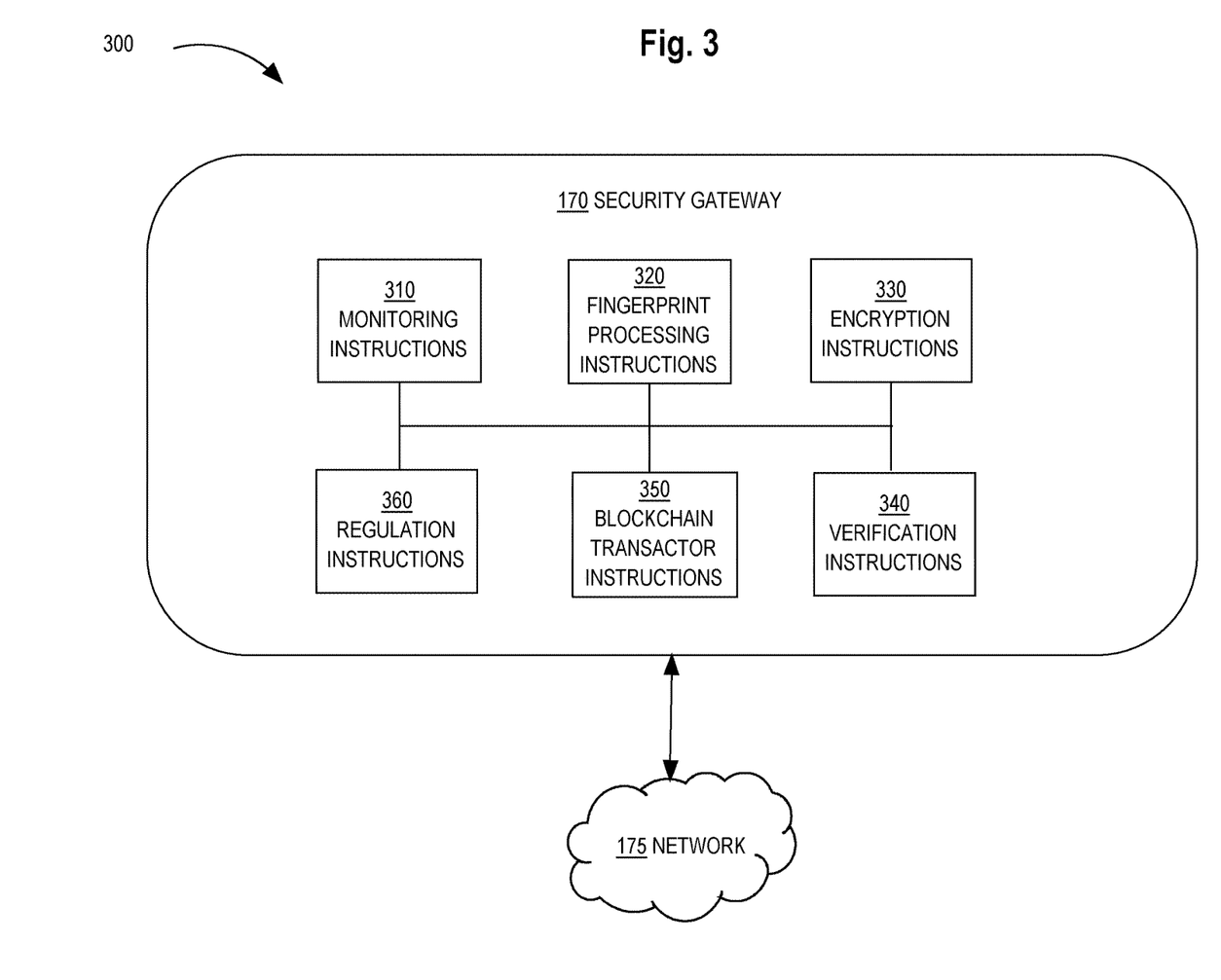
FIG. 3 illustrates a security gateway, in an example embodiment.

FIG. 3 illustrates a security gateway, in an example embodiment.

In an embodiment, reference numeral 300 indicates a computing system comprising the security gateway 170 coupled to the data network 175. The security gateway 170 may be a computer, software and/or hardware or a combination storing instructions and/or databases that access and utilize encrypted data from the distributed ledger 190 for conducting device integrity health checks. Specifically, the security gateway 170 may connect to the distributed ledger 190 through the network 175 to access the encrypted data, as well as remotely fingerprinting the node 110, 135 in real time to perform device integrity health checks. In response to performing out-of-band health checks, any unauthorized changes to the node 110, 135 may be rolled back such that the unauthorized changes are removed from the node 110, 135. When the security gateway 170 is inline between devices and between devices and users, the security gateway 170 may behave as a firewall and, depending on whether the fingerprints match, allow traffic from the node 110, 135 through or block the traffic from the node 110, 135.

The security gateway 170 may be programmed to accommodate a wide variety of different communication protocols, such as, for example, HTTP, Real Time Streaming Protocol (RTSP) over HTTP, Secure Socket Shell (SSH), Telnet, Operational Technology (OT) protocols such as MQTT, and Object linking and embedding for Process Control Unified Architecture (OPC UA), Windows Remote Management (WinRM) or any other applicable protocol, to directly communicate with the node 110, 135. The security gateway 170 may use monitoring instructions 310 to continuously monitor each node 110, 135 and current security service data associated with the node 110, 135, and may use fingerprint processing instructions 320 to remotely generate a fingerprint based on the current security service data of the node 110, 135 by traversing its configuration, software versions, and parameters using remote login via SSH, Telnet, or HTTP, or using a native protocol (for example, Modbus, DNP3, etc.) the node 110, 135 supports. The fingerprint comprises the same multiple object identifiers previously used by the security broker 105. In an embodiment, these object identifiers are specified in the security policies.

The security gateway 170 may use encryption instructions 330 to encrypt one or more object identifiers using the same hash algorithm that was previously used by the security broker 105 to generate the fingerprint.

The security gateway 170 may then use verification instructions 340 to conduct a device integrity health check by comparing the current encrypted data to the encrypted data stored in the distributed ledger 190. In an embodiment, the verification instructions 340 may work in conjunction with distributed ledger transactor instructions 350 to retrieve the fingerprint from the distributed ledger 190 for comparison purposes. The verification instructions 340 may compare the calculated hash value with the hash value stored in the distributed ledger 190 and determine if there is a match. If the hashes do not match, then regulation instructions 360 may work in conjunction with the security broker 175 to restore the security service data from the digital replica of the node 110, 135 over unauthorized changes the node 110, 135.

The entire health check verification process may be conducted out-of-band but in parallel to and in real time with the in-band data communication between the nodes 110, 135. This approach allows for protocol-agnostic health checks that do not depend upon the specific protocols that are used to exchange data in-band because the health checks occur out-of-band.

Figure 4:
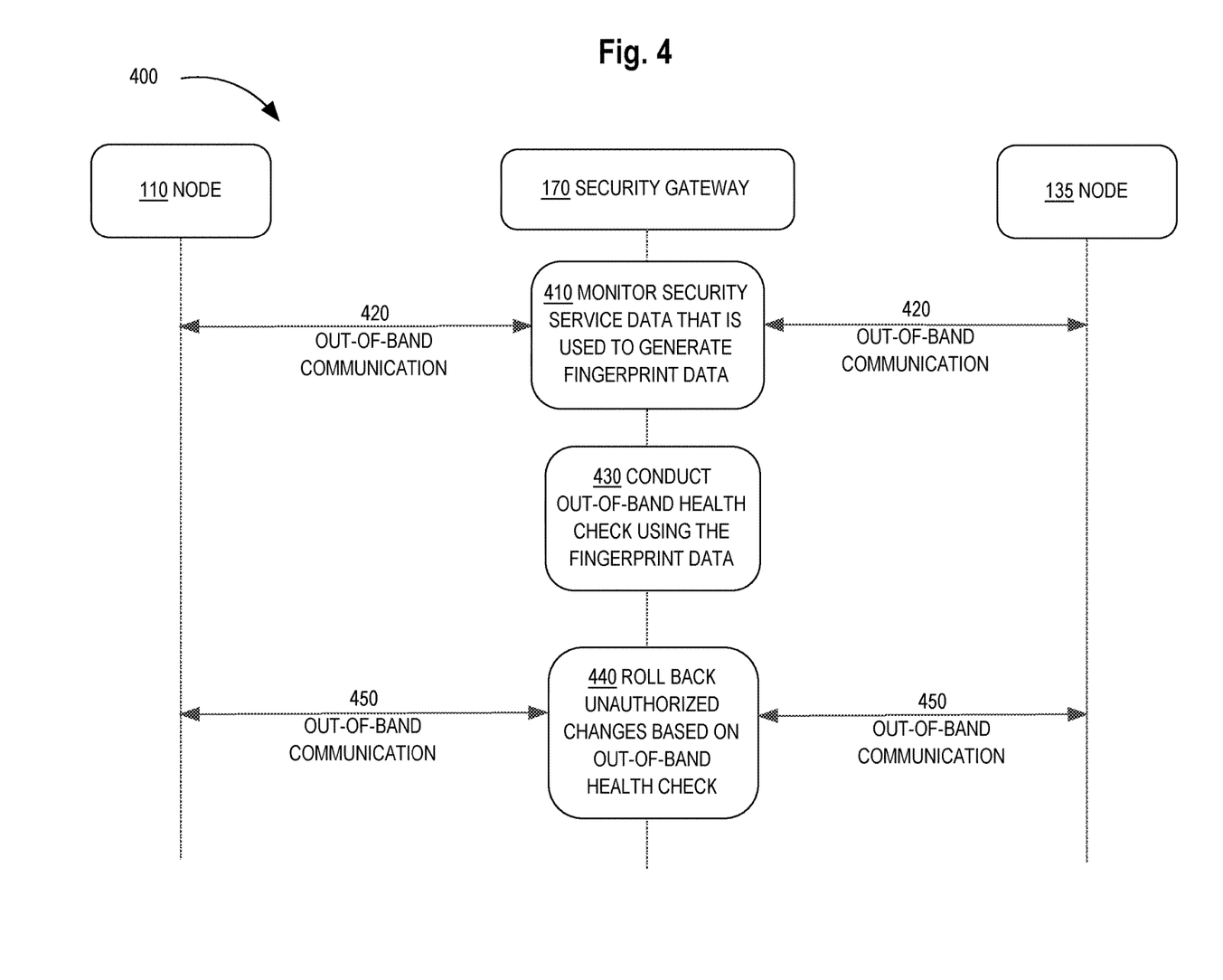
FIG. 4 illustrates a device message flow, in an example embodiment.

FIG. 4 illustrates a device message flow, in an example embodiment.

In an example message flow 400, the security gateway 170 may, at step 410, engage in continuous monitoring of the hardware identifier 115, 140, the file system 120, 145, the memory space 125, 150, the process space 130, 155, or any other features of the node system 110, 135 for hardware data, software data, firmware data, memory usage data, or any other data that is used to generate a fingerprint.

At step 420, the security gateway 170 may remotely generate a fingerprint data of the node system 110, 135 using out-of-band communication 420.

At step 430, the security gateway 170 may use the generated fingerprint data and fingerprint data stored in the distributed ledger 190 to conduct out-of-band health checks.

At step 440, based on the out-of-band health checks, any unauthorized changes to the node system 110, 135 are rolled back. For example, if the health checks conclude that the fingerprints do not match, then the initial identity or profile of the node system 110, 135 is restored on the node system 110, 135, using out-of-band communication 450. For example, the security service data from the digital replica of the node system 110, 135 are restored on the node system 110, 135, using out-of-band communication 450. In an embodiment, when the security gateway 170 is inline between devices or between devices and users, the security gateway 170 may behave as a firewall, thereby either allowing traffic from the node system 110, 135 through when fingerprints match or blocking traffic from the node system 110, 135 when fingerprints do not match.

3.3 Distributed Ledger Operations

In other applications, a distributed ledger functions as a decentralized digital ledger that tracks numerous entries. Copies of the entire distributed ledger may be stored at each computer 185, or node, in a distributed network of interconnected computers of which FIG. 1 illustrates computer 185 with distributed ledger 190.

In an embodiment, proposed entries to the distributed ledger 190 may be checked by a majority of the computers for verification. For example, if the distributed ledger transactor instructions 230 of the security broker 105 attempts to generate a new entry in the distributed ledger 190, the network of interconnected computers that also store copies of the distributed ledger would first run algorithms to evaluate the hashes and verify the validity of the entry. If a majority of the computers agree that the entry is valid, then the entry will be added as a new block in the distributed ledger 190. As a part of a consensus network, distributed ledger 190 enforces high Practical Byzantine Fault Tolerance (PBFT) and other types of consensus algorithms; for example, a malicious attack attempting to alter the information in the distributed ledger 190 would need to control over 50% of the computers in the consensus network to alter the consensus. Since it would be exceedingly difficult to maliciously attack and maintain control over that many computers, the distributed ledger data is better protected against malicious attacks than traditional methods of data storage.

Figure 5:
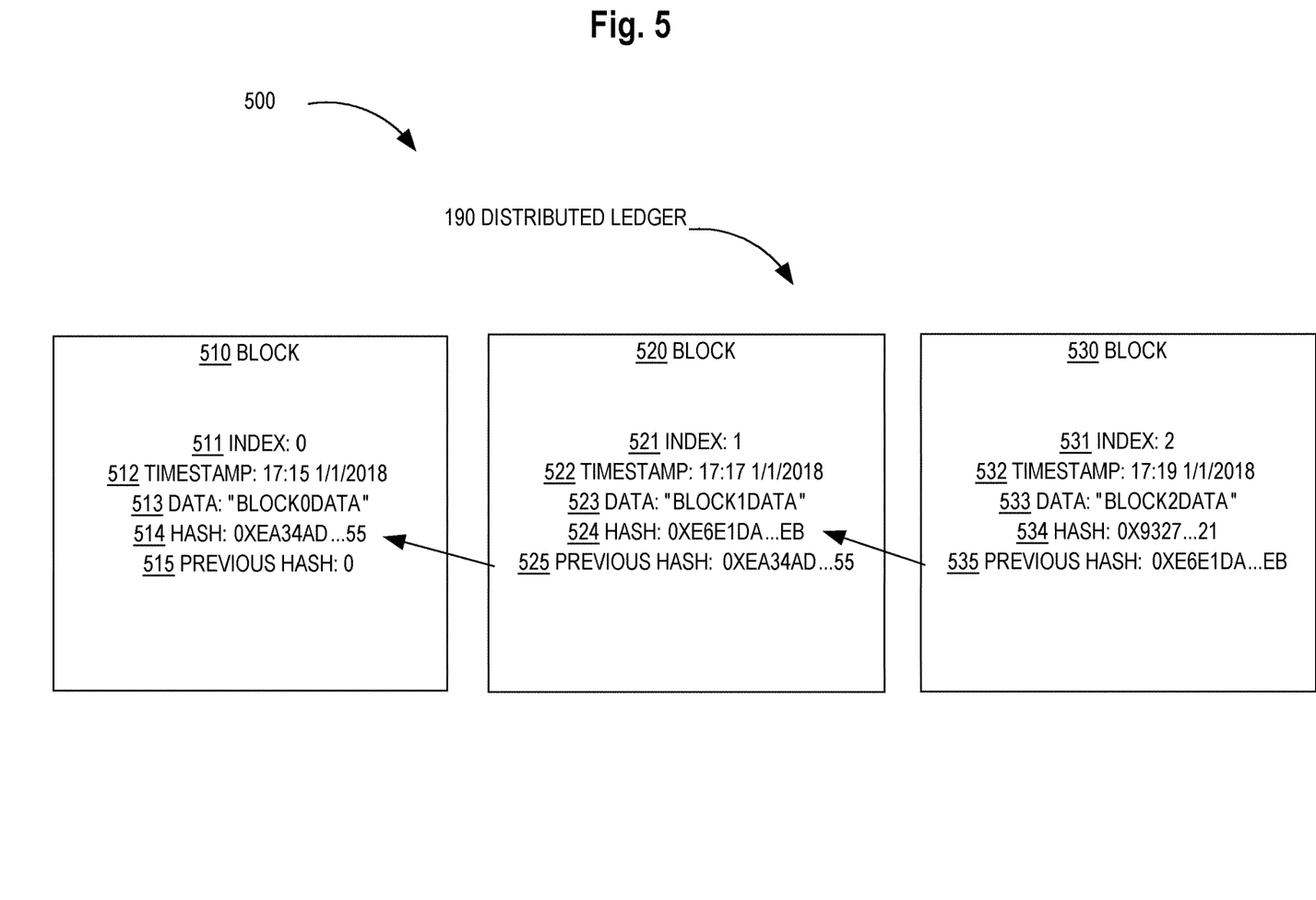
FIG. 5 illustrates a distributed data repository, in an example embodiment.

FIG. 5 illustrates a distributed data repository.

In an example embodiment, the distributed data repository 500 is a digital distributed ledger database 500. The distributed data repository 500 comprises the distributed ledger 190 having blocks 510, 520, 530. The distributed ledger 190 may include any number of blocks. In the example of FIG. 5, each block 510, 520, 530 may include its own index number 511, 521, 531, timestamp 512, 522, 532, data 513, 523, 533, hash 514, 524, 534, and previous hash 515, 525, 535.

The index number 511, 521, 531 may be a numerical index that indicates the block's placement in the chain. The timestamp 512, 522, 532 may be the date and time of when a block 510, 520, 530 is created. The data 513, 523, 533 may be an encrypted share stored as "block0data," "block1data," and "block2data" in the blocks 510, 520, 530, respectively. The hash 514, 524, 534 may be a hash of the encrypted share, such as an MD5 hash, SHA256 hash, or RIPEMD hash. The previous hash 515, 525, 535 may be the hash of the previous block, which links the blocks in sequence. In the example of FIG. 5, the block 530 stores a record of the previous hash 524, while the block 520 stores a record of the previous hash 514. These records of previous hashes link each new block to the previous block to form a chain that allows for integrity checks of each block.

4.0 Procedural Overview

Figure 6:
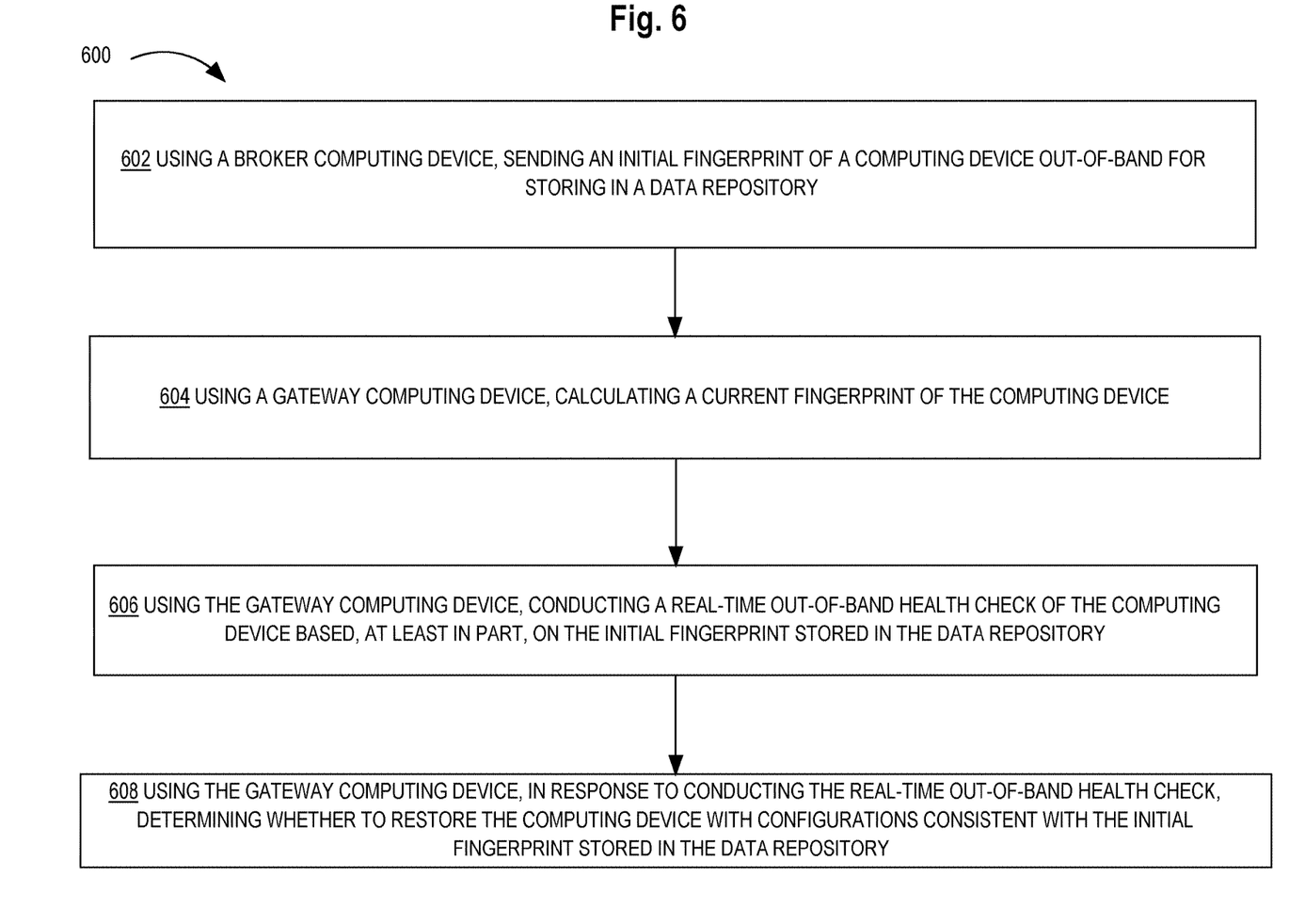
FIG. 6 illustrates an algorithm or method for conducting out-of-band health checks, in an example embodiment.

FIG. 6 illustrates an algorithm or method for conducting out-of-band health checks, in an example embodiment. For purposes of illustrating a clear example, FIG. 6 is described herein in the context of FIG. 1, but the broad principles of FIG. 6 can be applied to other systems having configurations other than as shown in FIG. 1. Further, FIG. 6 and each other flow diagram herein illustrates an algorithm or plan that may be used as a basis for programming one or more of the functional modules of FIG. 1 that relate to the functions that are illustrated in the diagram, using a programming development environment or programming language that is deemed suitable for the task. Thus, FIG. 6 and each other flow diagram herein are intended as an illustration at the functional level at which skilled persons, in the art to which this disclosure pertains, communicate with one another to describe and implement algorithms using programming. The flow diagrams are not intended to illustrate every instruction, method object or sub step that would be needed to program every aspect of a working program, but are provided at the high, functional level of illustration that is normally used at the high level of skill in this art to communicate the basis of developing working programs.

In one embodiment, a method 600 starts at step 602 where an initial fingerprint of a computing device, such as an industrial IoT device represented by the node 110, 135, is sent out-of-band for storing in a distributed data repository. For example, a security broker 105 obtains initial security service data, such as initial hardware data, initial software data, initial firmware data, initial memory usage data, or any other initial data from the computing device. The security broker 105 generates initial object identifiers for specific types of data and encrypts initial object identifiers by applying a hash function to calculate the initial fingerprint. The initial fingerprint is a collection of these encrypted initial object identifiers that uniquely identifies a particular node system. Subsequently, the security broker 105 may send the encrypted fingerprint out-of-band to the distributed data repository for storage. The distributed data repository may be a digital distributed ledger data repository.

At step 604, a security gateway 170 may remotely calculate a current digital fingerprint of the computing device. For example, the security gateway 170 accesses current security service data of the computing device by using the native protocol of the computing device. The current security service data may include current hardware data, current software data, current firmware data, current memory usage data, or any other current data from the computing device. The security gateway 170 encrypts the same object identifier(s) previously used by the security broker 105, using the same hash function previously used by the security broker 105, to generate the current digital fingerprint. In an embodiment, the security broker 105 may store security policies that specify which of the one or more object identifiers may be used by the security gateway 170 in conducting the real-time out-of-band health check.

At step 606, the security gateway 170 conducts a real-time out-of-band health check of the computing device, based in part on the initial fingerprint that is stored in the distributed data repository. Specifically, the security gateway 170 conducts a health check by accessing the initial fingerprint that is stored in the distributed data repository and comparing it to the current fingerprint remotely calculated in step 604.

At step 608, the security gateway 170 determines whether to restore the computing device with configurations consistent with the initial digital fingerprint stored in the distributed data repository. If the data from the health check matches, then the security gateway 170 may determine that the integrity of the computing device has not been compromised by malware or bots. However, if the data does not match, then the security gateway 170 may determine that the integrity of the computing device has been compromised. As a result, the security gateway 170 may work in conjunction with the security broker 105 to restore the initial profile of the computing device by rolling back unauthorized changes to the computing device. For example, the security broker 105 may store a digital replica of the computing device, including data related to its hardware identifier, its file systems, its memory space, its process space, or any other features of the computing device. The digital replica may be stored locally in a data repository associated with the security broker 105. When the computing device has been determined to be comprised, the security service data from the digital replica is restored on the computing device. In an embodiment, when the security gateway 170 is inline between devices or between devices and users, the security gateway 170 may behave as a firewall, thereby either allowing traffic from the node system 110, 135 through when fingerprints match or blocking traffic from the node system 110, 135 when fingerprints do not match.

In an embodiment, any authorized changes to the security service data of a node 110, 135 may be implemented through the security broker 105. The security broker 105 may encrypt the updated security service data to generate an updated fingerprint, which is saved to the distributed ledger 190 and used for subsequent health checks.

Using the foregoing techniques, programmed computers may use a distributed system to transfer, store, monitor, and utilize sensitive data in a manner that maximizes data security while improving device data integrity health checks. Implementations provide for decreased use of network bandwidth by using out-of-band communications and decreased use of processing resources for computing devices that no longer provide these health checks. Specifically, by using a distributed system of security brokers 105, agents 180, distributed ledgers 190, and security gateways 170 to acquire, store, and compare security service data, the distributed system offers an improved method of detecting potential security breaches out-of-band while regulating in-band data communications to protect against any detected breaches.

Moreover, the foregoing techniques realize an improvement in computer functionality, specifically in relation to detecting and protecting against malware, botnets, and hardware manipulation. Previous approaches often depended upon prior knowledge of malware and botnet signatures and attack patterns. However, the current approach ensures that all authorized changes to the nodes 110, 135 are conducted through the security broker 105 and any other changes are detected through continuous monitoring and health checks by the security gateway 170. Any unauthorized changes to the nodes 110, 135 may indicate a security breach and may be rolled back. This provides an improvement compared to other security protection techniques that are based on previously-identified malware and botnets.

Furthermore, the approaches disclosed herein improve data security and data integrity by tamper proofing the data. The use of the distributed ledger 190 ensures that all changes to security service information are first approved by the consensus network, which protects the integrity of the distributed ledger data. The nature of the distributed ledger 190 also ensures that each new block of data is linked to the previous block, creating an improved method of documenting changes and rejecting unapproved changes. Consequently, the distributed ledger 190 functions as a secure backup for sensitive security service information with high Practical Byzantine Fault Tolerance (PBFT) and other types of consensus algorithms.

5.0 Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques or may include digital electronic devices such as at least one application-specific integrated circuit (ASIC) or field programmable gate array (FPGA) that is persistently programmed to perform the techniques or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 7:
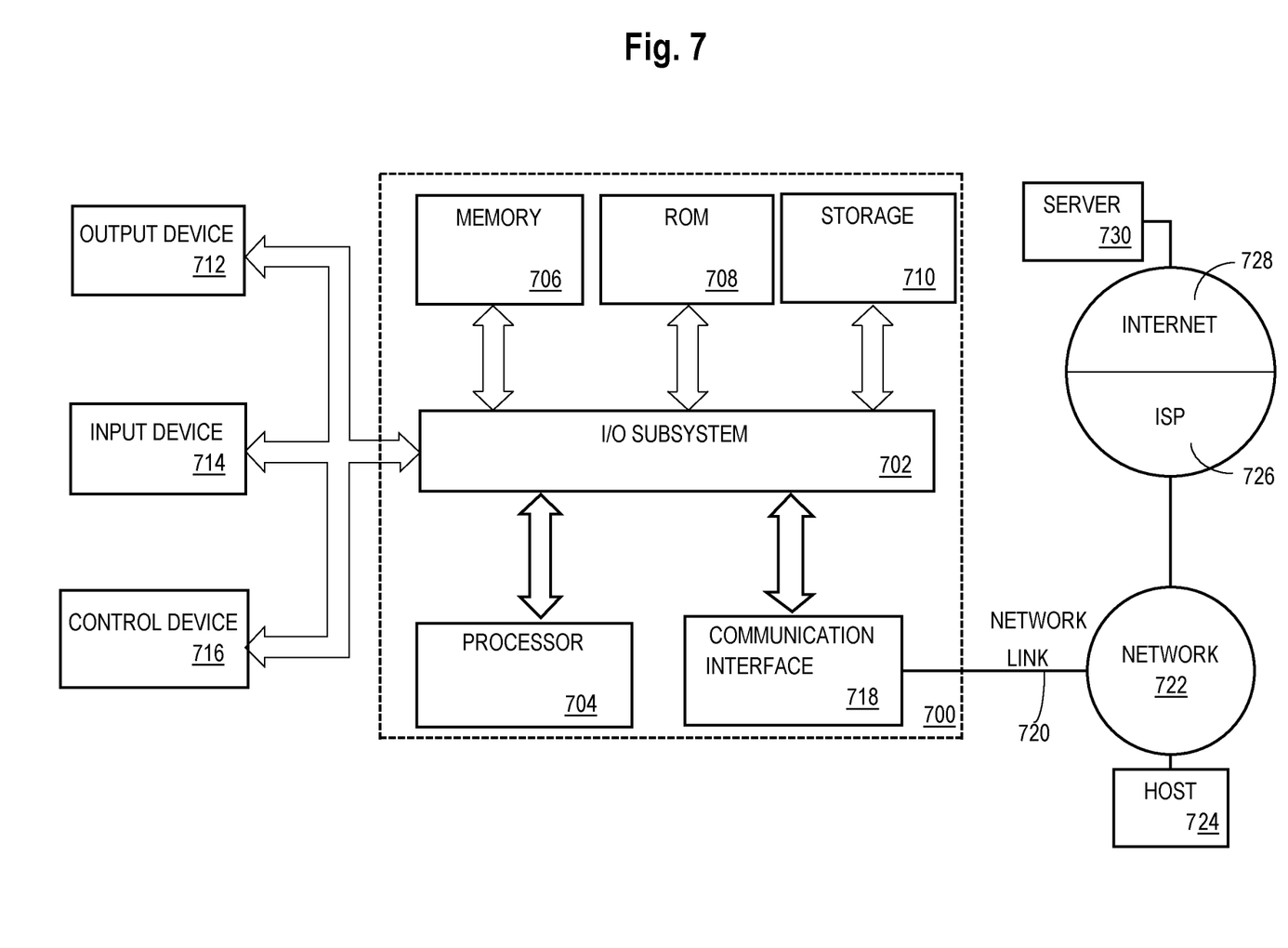
FIG. 7 illustrates a computer system upon which an embodiment of the invention may be implemented.

FIG. 7 is a block diagram that illustrates an example computer system with which an embodiment may be implemented. In the example of FIG. 7, a computer system 700 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 700 includes an input/output (I/O) subsystem 702 which may include a bus and/or other communication mechanism(s) for communicating information and/or instructions between the components of the computer system 700 over electronic signal paths. The I/O subsystem 702 may include an I/O controller, a memory controller and at least one I/O port. The electronic signal paths are represented schematically in the drawings, for example as lines, unidirectional arrows, or bidirectional arrows.

At least one hardware processor 704 is coupled to I/O subsystem 702 for processing information and instructions. Hardware processor 704 may include, for example, a general-purpose microprocessor or microcontroller and/or a special-purpose microprocessor such as an embedded system or a graphics processing unit (GPU) or a digital signal processor or ARM processor. Processor 704 may comprise an integrated arithmetic logic unit (ALU) or may be coupled to a separate ALU.

Computer system 700 includes one or more units of memory 706, such as a main memory, which is coupled to I/O subsystem 702 for electronically digitally storing data and instructions to be executed by processor 704. Memory 706 may include volatile memory such as various forms of random-access memory (RAM) or other dynamic storage device. Memory 706 also may be used for storing temporary variables or other intermediate information during execution of instructions to be executed by processor 704. Such instructions, when stored in non-transitory computer-readable storage media accessible to processor 704, can render computer system 700 into a special-purpose machine that is customized to perform the operations specified in the instructions.

Computer system 700 further includes non-volatile memory such as read only memory (ROM) 708 or other static storage device coupled to I/O subsystem 702 for storing information and instructions for processor 704. The ROM 708 may include various forms of programmable ROM (PROM) such as erasable PROM (EPROM) or electrically erasable PROM (EEPROM). A unit of persistent storage 710 may include various forms of non-volatile RAM (NVRAM), such as FLASH memory, or solid-state storage, magnetic disk or optical disk such as CD-ROM or DVD-ROM and may be coupled to I/O subsystem 702 for storing information and instructions. Storage 710 is an example of a non-transitory computer-readable medium that may be used to store instructions and data which when executed by the processor 704 cause performing computer-implemented methods to execute the techniques herein.

The instructions in memory 706, ROM 708 or storage 710 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 700 may be coupled via I/O subsystem 702 to at least one output device 712. In one embodiment, output device 712 is a digital computer display. Examples of a display that may be used in various embodiments include a touch screen display or a light-emitting diode (LED) display or a liquid crystal display (LCD) or an e-paper display. Computer system 700 may include other type(s) of output devices 712, alternatively or in addition to a display device. Examples of other output devices 712 include printers, ticket printers, plotters, projectors, sound cards or video cards, speakers, buzzers or piezoelectric devices or other audible devices, lamps or LED or LCD indicators, haptic devices, actuators or servos.

At least one input device 714 is coupled to I/O subsystem 702 for communicating signals, data, command selections or gestures to processor 704. Examples of input devices 714 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 716, which may perform cursor control or other automated control functions such as navigation in a graphical interface on a display screen, alternatively or in addition to input functions. Control device 716 may be a touchpad, a mouse, a trackball, or cursor direction keys for communicating direction information and command selections to processor 704 and for controlling cursor movement on display 712. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device.

An input device 714 may include a combination of multiple different input devices, such as a video camera and a depth sensor.

In another embodiment, computer system 700 may comprise an internet of things (IoT) device in which one or more of the output device 712, input device 714, and control device 716 are omitted. Or, in such an embodiment, the input device 714 may comprise one or more cameras, motion detectors, thermometers, microphones, seismic detectors, other sensors or detectors, measurement devices or encoders and the output device 712 may comprise a special-purpose display such as a single-line LED or LCD display, one or more indicators, a display panel, a meter, a valve, a solenoid, an actuator or a servo.

When computer system 700 is a mobile computing device, input device 714 may comprise a global positioning system (GPS) receiver coupled to a GPS module that is capable of triangulating to a plurality of GPS satellites, determining and generating geo-location or position data such as latitude-longitude values for a geophysical location of the computer system 700. Output device 712 may include hardware, software, firmware and interfaces for generating position reporting packets, notifications, pulse or heartbeat signals, or other recurring data transmissions that specify a position of the computer system 700, alone or in combination with other application-specific data, directed toward host 724 or server 730.

Computer system 700 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 700 in response to processor 704 executing at least one sequence of at least one instruction contained in main memory 706. Such instructions may be read into main memory 706 from another storage medium, such as storage 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 710. Volatile media includes dynamic memory, such as memory 706. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 702. Transmission media can also take the form of acoustic or light waves, such as those generated during radio-wave and infra-red data communications.

Various forms of media may be involved in carrying at least one sequence of at least one instruction to processor 704 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 700 can receive the data on the communication link and convert the data to a format that can be read by computer system 700. For instance, a receiver such as a radio frequency antenna or an infrared detector can receive the data carried in a wireless or optical signal and appropriate circuitry can provide the data to I/O subsystem 702 such as place the data on a bus. I/O subsystem 702 carries the data to memory 706, from which processor 704 retrieves and executes the instructions. The instructions received by memory 706 may optionally be stored on storage 710 either before or after execution by processor 704.

Computer system 700 also includes a communication interface 718 coupled to bus 702. Communication interface 718 provides a two-way data communication coupling to network link(s) 720 that are directly or indirectly connected to at least one communication networks, such as a network 722 or a public or private cloud on the Internet. For example, communication interface 718 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 722 broadly represents a local area network (LAN), wide-area network (WAN), campus network, internetwork or any combination thereof. Communication interface 718 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 718 sends and receives electrical, electromagnetic or optical signals over signal paths that carry digital data streams representing various types of information.

Network link 720 typically provides electrical, electromagnetic, or optical data communication directly or through at least one network to other data devices, using, for example, satellite, cellular, Wi-Fi, or BLUETOOTH technology. For example, network link 720 may provide a connection through a network 722 to a host computer 724.

Furthermore, network link 720 may provide a connection through network 722 or to other computing devices via internetworking devices and/or computers that are operated by an Internet Service Provider (ISP) 726. ISP 726 provides data communication services through a world-wide packet data communication network represented as internet 728. A server computer 730 may be coupled to internet 728. Server 730 broadly represents any computer, data center, virtual machine or virtual computing instance with or without a hypervisor, or computer executing a containerized program system such as DOCKER or KUBERNETES. Server 730 may represent an electronic digital service that is implemented using more than one computer or instance and that is accessed and used by transmitting web services requests, uniform resource locator (URL) strings with parameters in HTTP payloads, API calls, app services calls, or other service calls. Computer system 700 and server 730 may form elements of a distributed computing system that includes other computers, a processing cluster, server farm or other organization of computers that cooperate to perform tasks or execute applications or services. Server 730 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 730 may comprise a web application server that hosts a presentation layer, application layer and data storage layer such as a relational database system using structured query language (SQL) or no SQL, an object store, a graph database, a flat file system or other data storage.

Computer system 700 can send messages and receive data and instructions, including program code, through the network(s), network link 720 and communication interface 718. In the Internet example, a server 730 might transmit a requested code for an application program through Internet 728, ISP 726, local network 722 and communication interface 718. The received code may be executed by processor 704 as it is received, and/or stored in storage 710, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 704. While each processor 704 or core of the processor executes a single task at a time, computer system 700 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

What is claimed is:
1. A computer-implemented method of providing improvements in security breach detection, comprising:

using a broker computing device, generating a digital replica of a computing device, wherein the digital replica comprises initial security service data of the computing device;

using the broker computing device, sending an initial digital fingerprint of the computing device out-of-band for storing in a distributed data repository, wherein the initial digital fingerprint is based on the initial security service data of the computing device;

using a gateway computing device, remotely calculating a current digital fingerprint of the computing device based on current security service data of the computing device;

using the gateway computing device, conducting a real-time out-of-band health check of the computing device based, at least in part, on the initial digital fingerprint stored in the distributed data repository; and using the gateway computing device, in response to conducting the real-time out-of-band health check, determining whether to restore the computing device with configurations consistent with the initial digital fingerprint stored in the distributed data repository.

2. The computer-implement method of claim 1, further comprising, using the broker computing device, encrypting the initial security service data of the computing device, wherein the initial digital fingerprint comprises the encrypted initial security service data.

3. The computer-implemented method of claim 1, further comprising:

using the broker computing device, receiving an authorized change to the initial security service data at the computing device and generating an updated fingerprint based on the authorized change to the initial security service data at the computing device; and using the broker computing device, sending the updated fingerprint out-of-band for storing in the distributed data repository, wherein conducting the real-time out-of-band health check of the computing device based, at least in part, on the fingerprint comprises using the updated fingerprint that is stored in the distributed data repository.

4. The computer-implemented method of claim 1, wherein the initial security service data comprises initial hardware data, initial firmware data, initial software data, and initial memory space data of the computing device, wherein the initial digital fingerprint comprises a plurality of initial encrypted data object identifiers, and wherein the plurality of initial encrypted data object identifiers is generated based on the initial security service data.

5. The computer-implemented method of claim 4, wherein the current security service data comprises current hardware data, current firmware data, current software data, and current memory space data of the computing device, wherein the current digital fingerprint comprises a plurality of current encrypted data object identifiers, and wherein the plurality of current encrypted data object identifiers is generated based on the current security service data.

6. The computer-implemented method of claim 1, wherein remotely calculating a current digital fingerprint of the computing device comprises using the gateway computing device, accessing the current security service data of the computing device by remoting logging into the computing device via SSH, Telnet, or HTTP, or by using a native protocol of the computing device.

7. The computer-implemented method of claim 1, wherein conducting the real-time out-of-band health check of the computing device comprises using the gateway computing device, comparing the current digital fingerprint that is remotely calculated to the initial digital fingerprint that is stored in the distributed data repository.

8. One or more non-transitory computer-readable storage media storing one or more instructions programmed for providing improvements in security breach detection and which, when executed by one or more intermediary computing devices, cause:

using a broker computing device, generating a digital replica of a computing device, wherein the digital replica comprises initial security service data of the computing device;

using the broker computing device, sending an initial digital fingerprint of the computing device out-of-band for storing in a distributed data repository, wherein the initial digital fingerprint is based on the initial security service data of the computing device;

using a gateway computing device, remotely calculating a current digital fingerprint of the computing device based on current security service data of the computing device;

using the gateway computing device, conducting a real-time out-of-band health check of the computing device based, at least in part, on the initial digital fingerprint stored in the distributed data repository; and using the gateway computing device, in response to conducting the real-time out-of-band health check, determining whether to restore the computing device with configurations consistent with the initial digital fingerprint stored in the distributed data repository.

9. The one or more non-transitory computer-readable storage media of claim 8, storing one or more further instructions which, when executed by the one or more intermediary computing devices, further cause, using the broker computing device, encrypting the initial security service data of the computing device, wherein the initial digital fingerprint comprises the encrypted initial security service data.

10. The one or more non-transitory computer-readable storage media of claim 8, storing one or more further instructions which, when executed by the one or more intermediary computing devices, further cause:

using the broker computing device, receiving an authorized change to the initial security service data at the computing device and generating an updated fingerprint based on the authorized change to the initial security service data at the computing device; and using the broker computing device, sending the updated fingerprint out-of-band for storing in the distributed data repository, wherein conducting the real-time out-of-band health check of the computing device based, at least in part, on the fingerprint comprises using the updated fingerprint that is stored in the distributed data repository.

11. The one or more non-transitory computer-readable storage media of claim 8, wherein the initial security service data comprises initial hardware data, initial firmware data, initial software data, and initial memory space data of the computing device, wherein the initial digital fingerprint comprises a plurality of initial encrypted data object identifiers, and wherein the plurality of initial encrypted data object identifiers is generated based on the initial security service data.

12. The one or more non-transitory computer-readable storage media of claim 11, wherein the current security service data comprises current hardware data, current firmware data, current software data, and current memory space data of the computing device, wherein the current digital fingerprint comprises a plurality of current encrypted data object identifiers, and wherein the plurality of current encrypted data object identifiers is generated based on the current security service data.

13. The one or more non-transitory computer-readable storage media of claim 8, wherein remotely calculating a current digital fingerprint of the computing device comprises using the gateway computing device, accessing the current security service data of the computing device by remoting logging into the computing device via SSH, Telnet, or HTTP, or by using a native protocol of the computing device.

14. The one or more non-transitory computer-readable storage media of claim 8, wherein conducting the real-time out-of-band health check of the computing device comprises using the gateway computing device, comparing the current digital fingerprint that is remotely calculated to the initial digital fingerprint that is stored in the distributed data repository.

15. A computer system providing improvements in security breach detection, the computer system comprising:
   a distributed ledger data repository;
   a broker computing device that is communicatively coupled to the distributed ledger data repository and comprising a first non-transitory data storage medium storing a first set of instructions which, when executed by the broker computing device, cause:
      generating a digital replica of a computing device, wherein the digital replica comprises initial security service data of the computing device;
      sending an initial digital fingerprint of the computing device out-of-band for storing in the distributed ledger data repository, wherein the initial digital fingerprint is based on the initial security service data of the computing device;
   a gateway computing device that is communicatively coupled to the distributed ledger data repository and comprising a second non-transitory data storage medium storing a second set of instructions which, when executed by the gateway computing device, cause:
      remotely calculating a current digital fingerprint of the computing device based on current security service data of the computing device;
      conducting a real-time out-of-band health check of the computing device based, at least in part, on the initial digital fingerprint stored in the distributed ledger data repository; and
      in response to conducting the real-time out-of-band health check, determining whether to restore the computing device with configurations consistent with the initial digital fingerprint stored in the distributed ledger data repository.

16. The computer system of claim 15, wherein remotely calculating a current digital fingerprint of the computing device comprises accessing the current security service data of the computing device by remoting logging into the computing device via SSH, Telnet, or HTTP, or by using a native protocol of the computing device.

17. The computer system of claim 15, wherein conducting the real-time out-of-band health check of the computing device comprises comparing the current digital fingerprint that is remotely calculated to the initial digital fingerprint that is stored in the distributed ledger data repository.

18. The computing system of claim 15, wherein the second set of instructions, when executed by the gateway computing device, further cause:
   in response to conducting the real-time out-of-band health checks, determining whether to allow traffic from the computing device through or to block the traffic from the computing device.

* * * * *